May 11, 1965     D. L. BITTNER     3,182,692
METERING DEVICE
Filed July 11, 1960     4 Sheets-Sheet 1
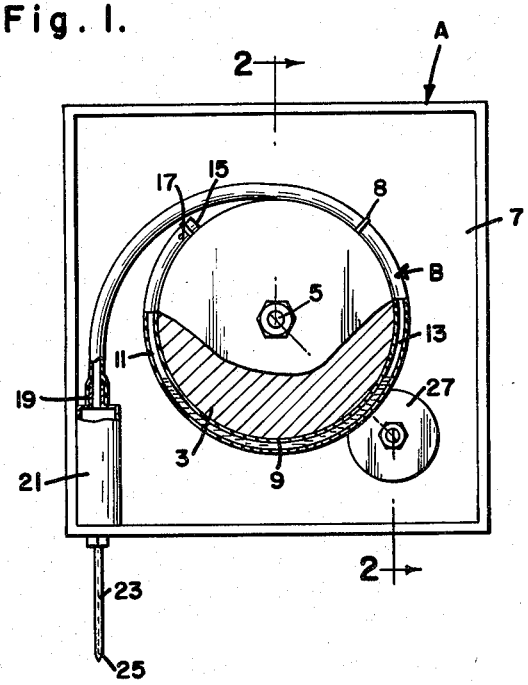
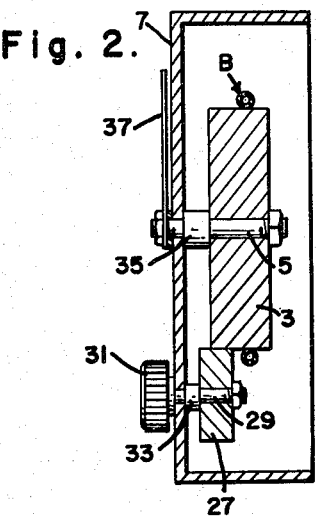
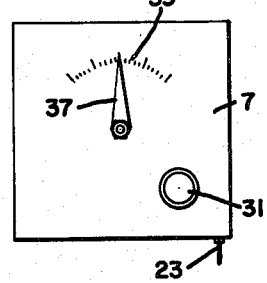
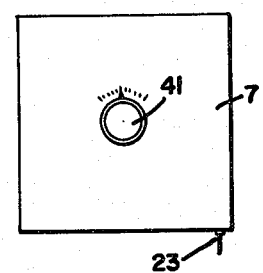
INVENTOR.
Donald L. Bittner
BY
Townsend and Townsend
attorneys May 11, 1965    D. L. BITTNER    3,182,692
METERING DEVICE
Filed July 11, 1960    4 Sheets-Sheet 2

INVENTOR.
Donald L. Bittner
BY Townsend and Townsend
attorneys

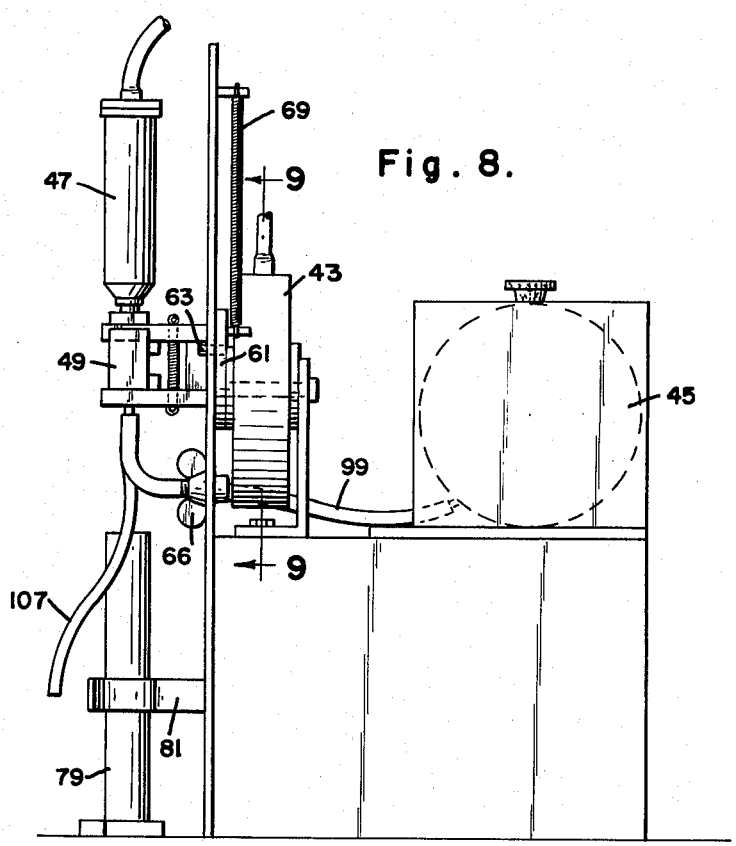
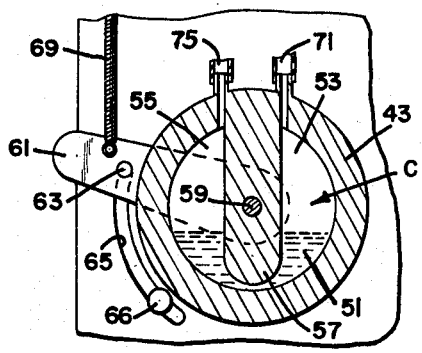
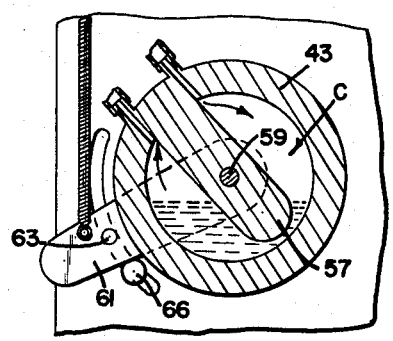

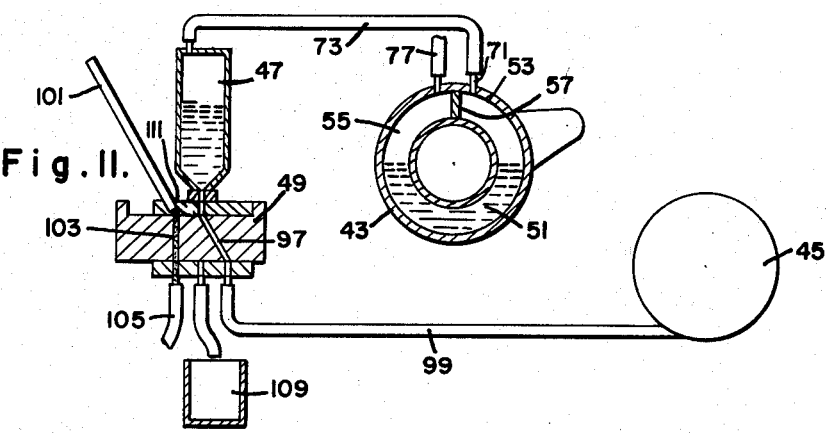
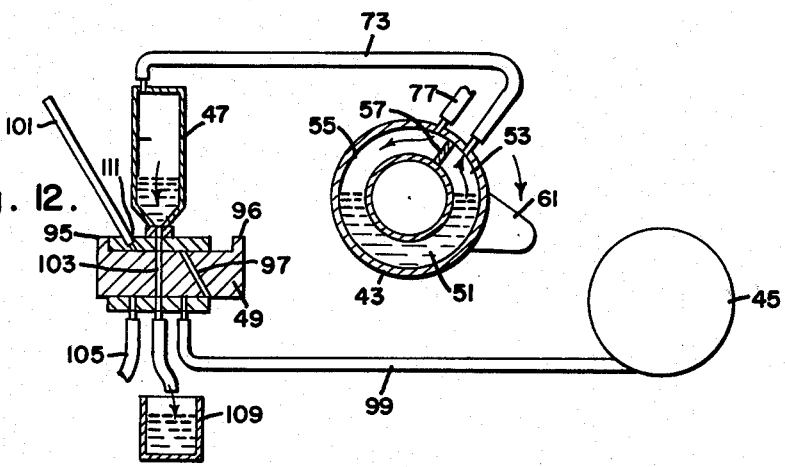
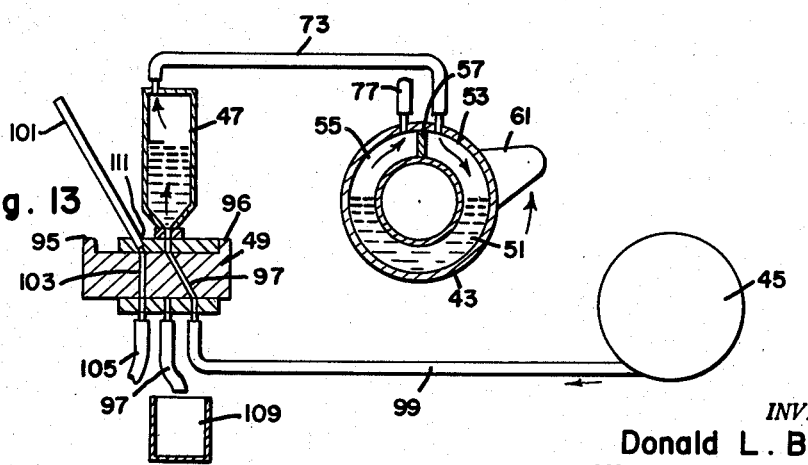

United States Patent Office 3,182,692
Patented May 11, 1965

3,182,692
METERING DEVICE
Donald L. Bittner, San Francisco, Calif.
(273 N. Bayshore Blvd., San Mateo, Calif.)
Filed July 11, 1960, Ser. No. 42,106
5 Claims. (Cl. 141—25)

This invention relates to the metering and dispensing of fluids and more particularly relates to a new and useful device for metering and dispensing fluids in equal volumes.

In the various types of chemical and biological analysis and also in many other fields in which fluids form an important part, there is a great need for instruments which can accurately transfer and deliver equal volumes of fluid.

This is especially true with respect to those methods of analysis which deal with samples in the quantity range commonly referred to in the art of micro-equivalents. When quantities of fluid in this range are utilized, the analyst must rely upon the accuracy of his instruments if satisfactory results are to be obtained. In this regard, much has been done in recent years to develop a number of good devices, as for example, the spectrophotometer, which are extremely accurate and have been of vast assistance to the analyst in minimizing the error in the overall process of analysis.

However, the prior art instruments with which I am familiar, and which are presently relied upon for the transfer and delivery of liquids and gases in the micro-equivalent quantitiy range have an accuracy which is dependent largely upon the skill of an operator. For the most part, such instruments comprise the familiar pipette and burette with various modifications. Generally speaking, these prior art instruments have several inherent deficiencies which make them unreliable as devices for accurately metering and dispensing fluids in the micro-equivalent or lambda range. The pipette and burette depend upon the skill and ability of the technician for precision measuring. For example, the calibration which represents the desired volume of fluid must be accurately matched with the level of fluid to be measured in the instrument. Also, when successive samples are required to be of equal volume it is virtually impossible for the technician to compare these volumes with the degree of accuracy demanded by the requirements of microgram chemistry and biology.

Another objection to the use of these instruments as accurate standards of measure is the fact that they are customarily calibrated with mercury at a temperature of 25° C. Thus when the instruments are handled by the technician or room temperature fluctuates the calibrations cannot be relied upon.

Still another disadvantage of these prior art devices is that they must be continually washed and dried causing considerable maintenance expense over an extended period of time. In this same connection, as these delicate instruments are fabricated primarily from glass they are readily susceptible to breakage, an item of expense which amounts to thousands of dollars per year in a large laboratory.

It is a primary object of the within invention to provide an instrument which can accurately meter and dispense fluids and in the operation of which human skill and ability forms virtually no part.

Generally, this object is accomplished by providing a fluid containing vessel having the capacity to create negative and positive pressures against a work fluid which pressures may be mechanically controlled so that equal volumes of fluid may be delivered to and dispensed from a second vessel.

More particularly, the instant invention provides a vessel which carries a quantity of work liquid or gas, a pressure exerting fluid means in the vessel in pressure contact with one surface of the work fluid. A pressure creating liquid means is maintained in pressure creating contact with the pressure exerting fluid means. This pressure creating liquid means is substantially heavier than the pressure exerting fluid means and is filled in a container movable to a first position to gravity urge the pressure creating liquid means to exert a predetermined force against the pressure exerting fluid means and is also movable to a second position to gravity urge the pressure creating liquid means to exert a second and lesser predetermined force against the pressure exerting fluid means. Thus, there is selectively caused a predetermined increase and decrease of pressure against the work fluid. Such vessel includes means to flow quantities of work fluid from the vessel in quantities directly proportional to the pressure exerted against the work fluid and means to flow work fluid into the vessel in inverse proportion to the pressure exerted against the work fluid in the vessel.

It is another object of the within invention to provide a device of the type above described from which the influences due to changes in temperature and barometric pressure is virtually eliminated. Accordingly, the above mentioned container is provided with means to communicate a portion thereof with atmosphere thereby eliminating confined fluid space therein.

Another object of the within invention is to provide a device for accurately metering and dispensing fluids in the quantity range of micro-equivalents. This object is accomplished by providing appaartus of the type above described in combination with a narrow bore nonwettable tube having a fine point at the end thereof.

Other objects of the present invention will become apparent upon reading the following specification and referring to the accompanying drawings in which similar characters of reference represent corresponding parts in each of the several views.

In the drawings:

FIG. 1 is a front elevational view showing the within invention mounted in a frame or housing.

FIG. 2 is a view taken along line 2—2 of FIG. 1.

FIG. 3 is an elevational view of the front panel of the housing of FIG. 1 illustrating the turn knob, indicator arm and scale.

FIG. 4 is a modification of the invention illustrated in FIG. 1 showing the turn knob combined with the indicator arm and scale.

FIG. 8 is a side elevational view of the embodiment of FIG. 5 shown schematically.

FIG. 9 is a view taken along line 9—9 of FIG. 8 showing the rotatable container in one position.

FIG. 10 is a view also taken along line 9—9 of FIG. 8 and shows the rotatable container in a second position.

Figure 5:
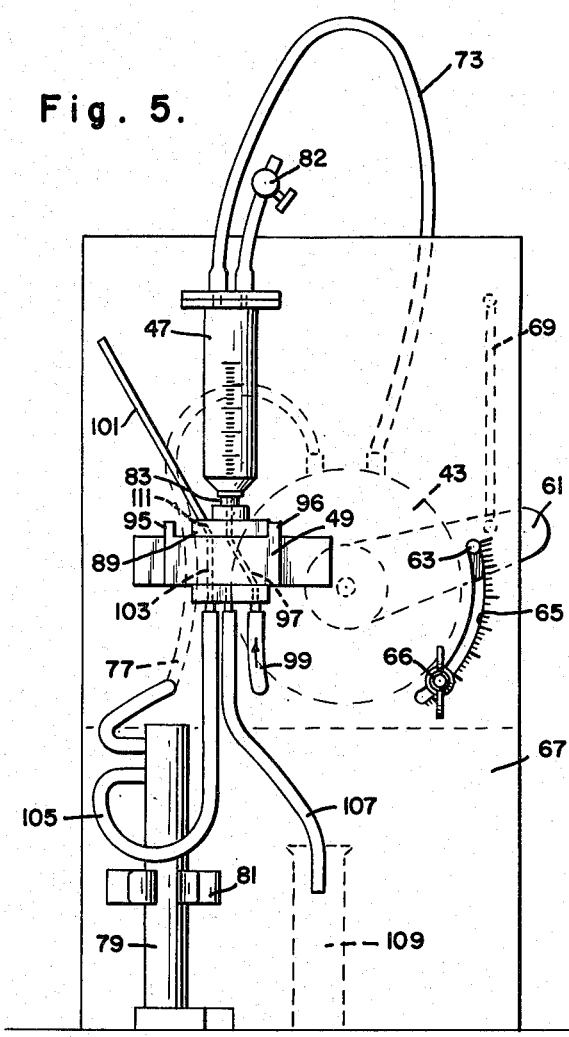
FIG. 5 is a front elevational view of second embodiment of the invention of FIG. 1 showing the movable valve means in one position.
Figure 6:
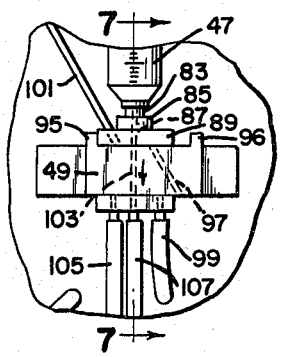
FIG. 6 is a view of the movable valve means of FIG. 5 showing said means in a second position.
Figure 7:
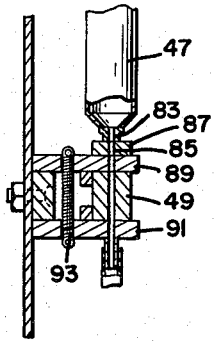
FIG. 7 is a view taken along line 7—7 of FIG. 6.

FIGS. 11, 12 and 13 schematically illustrate the sequence of operation of the embodiment shown in FIG. 5.

Referring now more particularly to the drawings, FIGS. 1, 2 and 3 illustrate a wheel at 3 mounted on a shaft 5 which is journalled for rotation in the front panel 7 of a housing member A. A length of tube B is attached to the wheel 3 by means of clips or bands such as that indicated at 8, and extends about the periphery of the wheel.

Tube B is of uniform cross-section and is partially filled with a heavy liquid such as mercury as indicated at 9.

Tube B also contains in portions 11 and 13 thereof, a fluid lighter than the mercury in communication therewith. One end 15 of tube B is provided with a valve 17 so that the fluid in portion 11 of the tube may communicate with the atmosphere. The opposite end 19 of the tube communicates with a reservoir 21. At the lower end of the reservoir 21 is a length of tube 23. This tube 23 is provided with a narrow bore (not shown) and a very fine tip 25 which permits the tube to deliver from the reservoir 21 fluids in the micro-equivalent quantity range. Preferably tube 23 is made from silicon, a non-wettable material which permits thorough drainage of fluids and eliminates the necessity of washing and drying.

As best seen in FIG. 2, a second wheel 27, which functions as the drive mechanism for wheel 3 is shown in frictional engagement therewith. The drive wheel 27 is mounted on a shaft 29 also journaled in panel 7. At the outer end of the drive wheel is a turn knob 31. Suitably spacing drive wheel 27 and wheel 3 from panel 7 are sleeves 33 and 35 which also serve as bearing members. An indicator arm 37 is attached to the outer end of shaft 5 and will register movement of the wheel 3 on scale 39.

When the wheel 3 is caused to rotate by turning the knob 31, the mercury in tube B will be urged by gravity to seek its own level. When this occurs, depending upon which direction the wheel is rotated, the fluid in portion 13 of tube B will be caused to exert negative or positive pressure against the fluid column in reservoir 21, assuming this fluid column is lighter than the mercury. As these negative and positive pressures are directly proportional to the decrease and increase in displacement of the pressure exerting fluid in portion 13, successive equal movements of the wheel in the same direction will cause identical volumes of fluid to be delivered either to or from reservoir 21.

For the convenience of the operator and also for the protection of its working parts, this device is preferably mounted to a fixed support and the only ability required of the operator is the ability to turn the knob 31 and to read the scale 39 which may be calibrated in terms of microliters.

This entire unit may be constructed from a handful of durable but inexpensive parts and requires but a few minutes to assemble.

FIG. 4 is a modification of the embodiment of FIG. 1 and shows a turn knob 41 attached to the tube wheel shaft 5 so that the apparatus includes but one moving part. This modification has the advantage of preventing possible inaccuracies due to the slippage and wear attendant a peripheral drive mechanism such as that shown in FIG. 2. Turn knob 41, if desired, may include a precision calibrated micrometer dial.

Apparatus constructed and arranged in accordance with the illustrations of FIGS. 1, 2, 3 and 4, has been found most advantageous in the titrimetric procedures applicable to microgram analysis and has been found capable of delivering quantities in the lambda range with excellent replicability down to one tenth of one percent error. Tests conducted under precise standards have shown an even lesser error.

Turning now to FIGS. 5 through 10, a second embodiment of the within invention is shown.

The apparatus of this embodiment comprises a fluid containing drum 43, a fluid storage tank 45, a buffer storage tank 47 and a movable valve assembly 49.

The drum 43 includes an inner chamber generally indicated at C which is partially filled with a mercury bath 51. On opposite sides of this bath 51 are air columns 53 and 55 in fluid communication with the mercury, but separated from each other by a partition 57 which has its lower end immersed in the mercury.

The drum 43 is mounted for rotatable movement on shaft 59 and is provided with an actuating lever 61 also connected to shaft 59. A small rod 63 projects from the lever and through the slotted portion 65 formed through mount frame 67. The rod 63 will abut the end margins of the slot 65 to limit the rotation of the drum 43. The slotted portion 65 may include an adjustable member 66 for engagement with the rod 63 at various positions between the upper and lower margins of slot 65.

Chamber 53 includes a valve 71 to which is attached a conduit 75 permitting fluid communication between buffer storage tank 47 and chamber 53. A like valve 75 normally permits chamber 55 to communicate with the atmosphere through conduit 77 which extends to an open test tube 79 mounted on frame 67 by means of clips 81. The buffer storage tank 47 is normally partially filled with work fluid and is closed from the atmosphere as by the closed off hose 82 communicating with the tank at a point above the upper level of the work fluid. This creates an air tight chamber between drum chamber 53 and the work fluid in the buffer storage tank 47.

The lower end of the buffer storage tank terminates in a narrowed open portion 83 which is in fixed alignment with an apertures 85 formed through stationary member 87 and upper valve assembly support member 89. Between this upper support member 89 and a lower support 91 the moveable valve assembly 49 is interposed and held tightly by a retaining spring 93. The valve assembly will slide laterally between supports 89 and 91 a distance limited by stops 95 and 96 and when stop 96 abuts upper support 89, valve 97 will establish communication between the buffer storage tank 47 and fluid storage tank 45 by means of conduit 99. When the valve is in this position communication is also established between a removable capillary tube 101 and test tube 79 through valve 103 and conduit 105.

When the valve assembly is moved to abut stop member 95 against upper support 89, valve 103 becomes aligned with conduit 107 leading to movable test tube 109. When the valve assembly is in this position valve 103 establishes communication between tube 109 and buffer storage tank 47.

The operation of the device can best be seen by referring to FIGS. 11 through 13 which schematically illustrate the cycle of the apparatus.

In FIG. 11, the apparatus is shown in a neutral position wherein the valve assembly 49 is shown communicating the buffer storage tank 47 with the fluid storage tank 45. The partition member 57 of the somewhat modified drum 43 is in a vertical position. When the drum is actuated to the downwardly position shown in FIG. 12, the fluid in chamber 53 undergoes an increase in displacement by the mercury 51 causing a positive pressure against the work fluid in the buffer storage tank 47. Since the valve assembly is communicating the open end of tank 47 with the test tube or beaker 109, a volume or work fluid is forced out of the buffer storage tank into the beaker. After the volume of work fluid has been dispensed from the tank 47, the drum 43 returns to neutral by action of return spring 69 (shown in FIG. 5). If the valve assembly has been moved to the position illustrated at FIG. 13, the return movement of the drum creates a negative force at the top of buffer storage tank 47 to draw a volume of work fluid from fluid storage tank 45 to the buffer storage tank. When the drum is moved the same distance in opposite directions, the volume of fluid drawn from the carrying tank 45 will be exactly equal to the volume of fluid dispensed from tank 47 to beaker 109. As is obvious, it the lever rod 63 is brought to bear against the lower margin of the slotted portion 65 on the downstroke and raised by the return spring 69 to the upper margin of the slotted portion, the point where its movement commenced, equal volumes of fluid may be successively dispensed from buffer storage chamber 47.

When it is desired to add a volume of fluid to a sample such as serum for colorimetric purposes, this device is particularly useful. A capillary tube 101 containing a volume of blood serum or like sample is placed in receiving slot 111. The operator may then cause the serum to be drawn from the capillary tube into valve 103 by tapping his thumb against the open end of test tube 79. The valve assembly is then moved to bring valve 103 into communication with the buffer storage tank 47, and the drum lever is actuated downwardly. The serum and the reagent or diluent from the buffer storage tank are dispensed into test tube 109. If a like volume of serum having a known quantity of the substance to be quantitively determined has been previously diluted with a volume of work fluid from the buffer storage tank the unknown quantity in the blood specimen can be readily determined by colorimetric procedures.

As is obvious, the metering of fluids by means of the above described device can be accomplished rapidly and accurately with virtually no skill required by the technician.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a metering device for metering precise quantities of fluid of the type having a fluid storage chamber, a buffer storage chamber mounted above the fluid storage chamber, and fluid communication means interconnecting said fluid storage chamber and said buffer storage chamber, the improvement comprising: a rotatably mounted tank; means dividing the upper portion of said tank into two sections; a heavy liquid carried within said tank extending above the bottom portion of said dividing means to divide said tank into two separate fluid tight sections; fluid communication means communicating a first one of said sections with said buffer storage chamber; means closing said buffer storage chamber to atmosphere, means to rotate said tank so as to increase the fluid displacement within the first of said sections and thereby create a partial vacuum within said buffer chamber to transfer fluid within the storage tank to said buffer storage chamber in proportion to the displacement created in the first of said sections, and valve means to release fluid communication between the buffer tank and the storage tank and open said buffer storage tank for metering fluid contained within said buffer tank to a dispensing area.

2. In a metering device according to claim 1 in which is provided means to limit rotation of said tank between a first and a second position and means to return said tank from said second position to said first position so that the quantity of fluid transferred from said storage tank to said buffer storage chamber is equal to the quantity of fluid metered from said buffer storage tank to said dispensing area.

3. In a metering device for metering precise quantities of fluid of the type having a fluid storage tank, a buffer storage tank mounted above the fluid storage tank, and fluid communication means interconnecting said fluid storage chamber and said buffer storage chamber, the improvement comprising: a rotatably mounted chamber; means dividing the upper portion of said chamber into two sections; a heavy liquid carried within said tank and extending above the bottom portion of said dividing means forming a fluid tight seal between said two sections; fluid communication means communicating a first one of said sections with said buffer storage tank; valve means operable to block fluid communication between said fluid storage tank and said buffer storage tank and to open communication between said buffer storage tank and atmosphere at one end thereof; means closing said buffer tank to atmosphere; means to rotate said chamber from a first to a second position so as to decrease fluid displacement within the first of said sections and thereby create a positive pressure in said buffer tank in proportion to the displacement created in the first of said sections, and to dispense a portion of fluid from said buffer tank when said valve means communicates said buffer tank to atmosphere; means to rotatably return said chamber to the second position when said valve means communicates said buffer tank with said fluid chamber so as to increase the fluid displacement within said first section equal to said increase in displacement aforesaid, thereby creating a partial vacuum within said buffer tank to cause a negative pressure to transfer fluid from said fluid storage tank to said buffer storage tank in a volume equal to the volume of fluid dispensed.

4. In a device for the alternate dispensing and filling of fluids in equal quantities of micro-magnitude, the combination comprising: a first vessel carrying a quantity of work liquid; means in fluid communication with said first vessel for receiving fluid therefrom and dispensing same in micro-quantities; a second vessel carrying a pressure exerting fluid and a pressure creating liquid therewithin, said pressure exerting fluid being in contact with said work fluid and with said presure creating liquid; said pressure creating liquid being substantially heavier than said pressure exerting fluid; said second vessel movable to a first position to gravity urge said pressure creating liquid to exert a predetermined negative pressure against said pressure exerting fluid and also movable to a plurality of other positions to gravity urge said pressure creating liquid to exert a plurality of successive, positive pressures against said pressure exerting fluid whereby said fluid receiving and dispensing means may receive and maintain a quantity of work fluid therein and dispense successive equal micro-quantities of work fluid therefrom; means to selectively urge said second vessel to said first and said other positions an indicating member; a scale of indicia associated with said indicating member for illustrating the position of said indicating member; and means operatively connecting said indicating member to the selectively urging means for moving said indicating member in accordance with said selectively urging means for moving said indicating member with respect to said scale of indicia in variable accordance with the amount of pressure exerted by said pressure creating liquid in response to movement of said selectively urging means.

5. In a device for the alternate dispensing and filling of liquids in equal quantities of micro-magnitude, the combination comprising: a first vessel carrying a quantity of work liquid; means in fluid communication with said first vessel for receiving fluid therefrom and dispensing same in micro-quantities; a second vessel carrying a pressure exerting fluid and a pressure creating liquid therewithin, said pressure exerting fluid in contact with said work fluid and with said pressure creating liquid; said pressure creating liquid being substantially heavier than said pressure exerting fluid; said second vessel movable to a first position to gravity urge said pressure creating liquid to exert a predetermined negative pressure against said pressure exerting fluid and also movable to a plurality of other positions to gravity urge said pressure creating liquid to exert a plurality of successive, positive pressures against said pressure exerting fluid whereby said fluid receiving and dispensing means may receive and maintain a quantity of work fluid therein and dispense successive equal micro-quantities of work fluid therefrom; means to selectively urge said second vessel to said first and said other positions including a wheel having an axis; means for mounting said second vessel on said wheel; a rotatable member operatively connected to said wheel to rotate said wheel about said axis; an indicating member mounted on said rotatable member and movable therewith; and a scale of indicia associated with said indicating member for illustrating the position of said indicating member, said indicating member and scale operative for indicating the amount of rotation of said second vessel, the pressure exerted by said pressure creating fluid in response to movement of said selectively urging means, thereby to control the dispensing of work fluid in successive equal micro-quantities to indicate the micro-quantity of work fluid dispensed.

References Cited by the Examiner
UNITED STATES PATENTS

| | | | |
|---|---|---|---|
| 391,189 | 10/88 | Pontallie | 230—76 |
| 1,687,007 | 10/28 | Cornwall et al. | 222—334 XR |
| 2,604,758 | 7/52 | Swindler | 60—62.6 |
| 2,622,765 | 12/52 | Gilmont | 23—259 XR |
| 2,674,948 | 4/54 | Roof | 230—76 XR |
| 2,960,868 | 11/60 | Price | 222—209 XR |
| 2,966,175 | 12/60 | Hyde | 141—27 |
| 3,011,684 | 12/61 | Corneil | 222—214 |

LAVERNE D. GEIGER, *Primary Examiner.*

RAPHAEL M. LUPO, *Examiner.*